United States Patent
van Seeventer et al.

(10) Patent No.: US 10,314,318 B2
(45) Date of Patent: Jun. 11, 2019

(54) POWDERED COMPOSITIONS CONTAINING AN EDIBLE OIL AND THEIR USE IN FOOD PRODUCTS

(75) Inventors: Paul Bastiaan van Seeventer, Meppel (NL); Sietze Theodorus Bouwer, Heiloo (NL); Patrick van der Waal, Castricum (NL)

(73) Assignee: STEPAN SPECIALTY PRODUCTS, LLC, Wilmington, DE (US)

( * ) Notice: Subject to any disclaimer, the term of this patent is extended or adjusted under 35 U.S.C. 154(b) by 1994 days.

(21) Appl. No.: 11/571,919

(22) PCT Filed: Jul. 12, 2005

(86) PCT No.: PCT/NL2005/000499
§ 371 (c)(1),
(2), (4) Date: Oct. 23, 2007

(87) PCT Pub. No.: WO2006/006856
PCT Pub. Date: Jan. 19, 2006

(65) Prior Publication Data
US 2008/0138493 A1 Jun. 12, 2008

(30) Foreign Application Priority Data
Jul. 13, 2004 (EP) .................................. 04077031

(51) Int. Cl.
*A23D 7/04* (2006.01)
*A23D 9/05* (2006.01)
(Continued)

(52) U.S. Cl.
CPC ............... *A23D 9/05* (2013.01); *A23D 7/015* (2013.01); *A23D 9/007* (2013.01); *A23D 9/04* (2013.01);
(Continued)

(58) Field of Classification Search
CPC ....................................................... A23D 7/04
See application file for complete search history.

(56) References Cited

U.S. PATENT DOCUMENTS 3,971,852 A 7/1976 Brenner et al.
4,438,106 A 3/1984 Wagu et al.
(Continued)

FOREIGN PATENT DOCUMENTS

EP 0 266 323 A 5/1988
EP 0 671 166 A 9/1995
(Continued)

OTHER PUBLICATIONS

Machine translation of JP 8259943 to Takeshi et al. Oct. 8, 1996. pp. 1-7.*
(Continued)

*Primary Examiner* — Jenna A Watts
(74) *Attorney, Agent, or Firm* — Barnes & Thornburg LLP

(57) ABSTRACT

Compositions comprising: (i) from 25% to 90% by weight of an edible oil; (ii) one or more sugar alcohols; and (iii) one or more reducing sugars; wherein the oil comprises at least 20% by weight of one or more carboxylic acids containing at least 18 carbon atoms and at least 2 carbon-carbon double bonds, or an ester thereof, and the weight ratio of (ii) to (iii) is from 2:1 to 1:40, exhibit good stability and other advantages and can be used in food products.

18 Claims, 1 Drawing Sheet

(51) Int. Cl.
*A23D 7/015* (2006.01)
*A23D 9/007* (2006.01)
*A23D 9/04* (2006.01)
*A23D 9/06* (2006.01)
*A23L 33/00* (2016.01)
*A23L 33/12* (2016.01)

(52) U.S. Cl.
CPC ............... *A23D 9/06* (2013.01); *A23L 33/12* (2016.08); *A23L 33/40* (2016.08); *A23V 2002/00* (2013.01)

(56) References Cited

U.S. PATENT DOCUMENTS

| | | | |
|---|---|---|---|
| 4,526,793 | A | 7/1985 | Ingenbleek et al. |
| 4,963,385 | A | 10/1990 | Taylor et al. |
| 5,569,482 | A * | 10/1996 | Naga et al. ............... 426/656 |
| 5,972,367 | A * | 10/1999 | Inoue et al. ............... 424/423 |
| 5,972,395 | A | 10/1999 | Arora et al. |
| 6,025,008 | A * | 2/2000 | Akahoshi et al. ............ 426/583 |
| 6,165,518 | A * | 12/2000 | Cain et al. ................. 426/74 |
| 6,197,813 | B1 | 3/2001 | Hegenauer |
| 6,638,557 | B2 | 10/2003 | Qi et al. |

FOREIGN PATENT DOCUMENTS

| | | | |
|---|---|---|---|
| EP | 1066761 A2 * | 1/2001 | ............ A23L 1/30 |
| JP | 8 51928 | 2/1996 | |
| JP | 8 259943 | 10/1996 | |
| JP | 08 259944 A | 10/1996 | |
| KR | 2001 007 866 A | 2/2001 | |
| WO | 89/02223 | 3/1989 | |
| WO | 94/01001 | 1/1994 | |
| WO | 97/37546 A | 10/1997 | |

OTHER PUBLICATIONS

Chang H.; "Processing Method of Shredded Squid"; Database WPI Week 2001, Derwent Publications Ltd., London, GB; AN 2001-472981; XP002294610. Entire document. Cited in International Search Report. document not provided.

Tohiyuki Toyosaki, "Antioxidant effect of Betacarotene on lipid peroxidation and synergism with tocopherol in an emulsified linoleic acid model system"; International Journal of Food Sciences and Nutrition; vol. 53, 2002, pp. 419-423.

Morelli, Roberto, et al.; "Fenton-Dependent Damage to Carbohydrates: Free Radical Scavenging Activity of Some Simple Sugars"; J. Agric. Food Chem.; 2003, vol. 51, pp. 7418-7425.

* cited by examiner

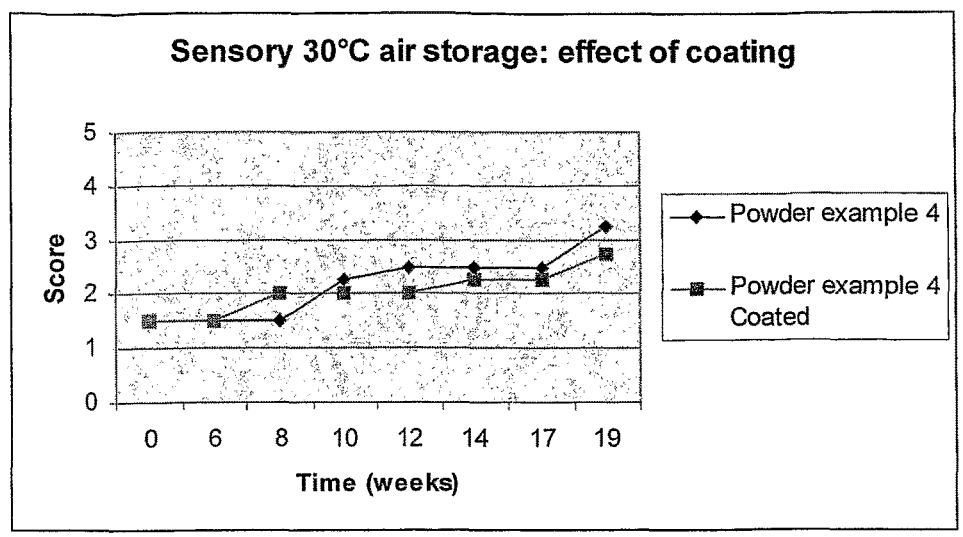

POWDERED COMPOSITIONS CONTAINING AN EDIBLE OIL AND THEIR USE IN FOOD PRODUCTS

BACKGROUND

This invention relates to compositions comprising an edible oil, especially to powdered compositions; to methods of producing these compositions; to food products comprising these compositions; and to the use of the compositions.

Edible oils that contain unsaturated fatty acids, and especially polyunsaturated fatty acids (PUFA), usually in the form of glyceride esters, have been shown to have beneficial health effects. These health effects include reduction of cholesterol levels, protection against coronary heart disease and suppression of platelet aggregation. For example, fish oil, which contains the omega-3 and omega-6 fatty acids docosahexaenoic acid (DHA) and eicosapentaenoic acid (EPA), has been used in food products and in nutritional products for its health benefits.

PUFA have been incorporated into a matrix. For instance, WO 97/37546 discloses free flowing compositions comprising a fat blend. As a further example, EP-A-1175836 discloses edible fat based flakes containing a fish oil.

One problem with PUFA is that they have a tendency to undergo oxidation and as a result can have an unpleasant taste and/or odour. This tendency also has a negative effect when the PUFA are stored; that is, the shelf or storage stability is relatively short because of the problems associated by the tendency to undergo oxidation.

Conventional powdered fish oils have therefore been treated in a specific way and/or incorporated agents that stabilise the PUFA against oxidation.

For example, WO-94/01001 discloses a microencapsulated oil or fat product on the basis of caseinate as the encapsulating compound. The use of caseinate as the only emulsifying agent optionally in combination with at least one carbohydrate results in relatively stable oil or fat products.

U.S. Pat. No. 3,971,852 describes a process wherein the use of polyhydroxy alcohols as a component within a micro encapsulating matrix can be beneficial to the final powder characteristics of the formed product. A lower surface area and less powder surface discontinuities are a result of this process. However, no special remarks have been made to a better oxidative shelf life of the hereby-obtained products.

U.S. Pat. No. 5,972,395 describes the combination of a minor part of a high molecular weight and a major part of a low molecular weight component within the encapsulating matrix for use in an extrusion process. The low molecular weight component can consist of low melting water soluble carbohydrates, sugar alcohols, adipic acid, citric acid, malic acid, and combinations thereof. However, no specific preference for any of these combinations has been made in respect to enhanced oxidation stability.

The stabilisation of aqueous emulsions containing fish oil using raffinose, trehalose or sorbitol together with a metal ion chelator is disclosed in U.S. Pat. No. 4,963,385. Stable liquid mineral ascorbate compositions and methods of manufacture and use are described in U.S. Pat. No. 6,197,813. The obtained liquid compositions are stabilised against oxidative degradation by the presence of sugar alcohols, sugars, or a metal ion chelator, or combinations thereof. WO 89/02223 describes the use of fructose for the stabilisation of emulsions containing fish oils, such as salad dressings.

It has also been suggested to stabilise fish oil with cyclodextrin, see, for example, U.S. Pat. No. 4,438,106. In a further development, U.S. Pat. No. 6,638,557 seeks to reduce the amount of cyclodextrin that is used in a composition containing an edible oil and starch by employing a converted starch and a starch hydrolysate in the composition. The starch hydrolysate is a maltodextrin or a thin boiled starch. These components can increase the viscosity of the composition before it is processed into a powder. This increase in viscosity can be a disadvantage in powder production.

It is known that some simple carbohydrates are potential hydroxyl radical scavengers in liquid compositions. See in this respect Int. J. Food Sciences and Nutrition, 2002, 53, 419 423 and J. Agric. Food Chem., 2003, 51, 7418-7425.

Further examples of conventional powdered fish oil containing agents that stabilise the PUFA against oxidation are described in JP-A-8-259944. This document discloses the use of sugar alcohols, such as mannitol, as oxidation stabilisers for emulsified oil or fat. Similar disclosures can be found in JP-A-8-259943 and JP-A-8-051928.

However, various disadvantages are to be expected employing the oxidative stabiliser as described in JP-A-8-259944. For instance, the high amount of mannitol, being a sweetener, within the described compositions can negatively affect the taste.

Furthermore, sugar alcohols such as mannitol are known for their laxative effect. Initial laxative threshold of mannitol varies between 20-40 g/day, although the accepted daily intake (ADI) of mannitol has not yet been specified by WHO (1987). The use of mannitol as described in the JP-A-8-259944 application to stabilise emulsified oil or fat is from an economical point of view also not preferred. The associated costs of polyols, e.g. mannitol, put limitations on the use according to JP-A-8-259944. Essentially, the use of mannitol in the way as taught in the prior art is disadvantageous because of both the cost issue and the limitations associated with laxative effects. These two disadvantages associated with the use of mannitol are even more profound when mannitol is used with the intention to increase the stability and shelf life of compositions containing low cost oils such as linseed oil, soya oil, sunflower oil or rapeseed oil. These type of compositions are generally used in relatively large quantities as a food ingredient in numerous food applications, generally consumed in relatively large amounts.

SUMMARY

The present invention aims to provide a composition containing an edible oil which has one or more of good stability to oxidation, better taste and/or odour (particularly after storage). The composition may also provide benefits in a food product to which it is added, including increased stability and better organoleptic properties (including taste and/or odour and/or texture).

BRIEF DESCRIPTION OF THE DRAWING

FIG. 1 is a graph that shows the sensory score of powder reconstituted in milk with the powder being stored for up to 21 weeks prior to reconstitution (1 is best with a neutral sensory profile and 5 is worst with an off-flavour sensory profile)

DESCRIPTION

According to the present invention, there is provided a composition comprising:

(i) from 25% to 90% by weight of an edible oil;
(ii) one or more sugar alcohols; and
(iii) one or more reducing sugars;

wherein the oil comprises at least 20% by weight of one or more carboxylic acids containing at least 18 carbon atoms and at least 2 carbon-carbon double bonds, or an ester thereof, and the weight ratio of (ii) to (iii) is from 2:1 to 1:40, preferably from 1:1 to 1:10, most preferably from 1:2 to 1:6. Preferably, the composition is suitable for use in a food product.

A further aspect of the invention is a food product comprising 0.01% to 70%, preferably 0.02 to 50%, more preferably 0.05% to 20% by weight of a composition of the invention.

Further, the invention relates to a process of producing a composition comprising edible oil, one or more sugar alcohols, and one or more reducing sugars, comprising the steps of providing an aqueous solution or dispersion of the ingredients as defined in detail herein-below; and spray-drying said aqueous solution or dispersion. In a preferred embodiment, the composition of the invention is a spray-dried powder.

The invention also provides the use of a composition of the invention for producing a food product.

Yet another aspect of the invention is the use of a combination of one or more sugar alcohols and one or more reducing sugars in a respective weight ratio of 2:1 to 1:40 to increase the stability of an edible oil comprising one or more carboxylic acids containing at least 18 carbon atoms and at least 2 carbon-carbon double bonds, or an ester thereof, as determined by the development of off taste and/or odour.

Also provided by the invention is the use of a combination of one or more sugar alcohols and one or more reducing sugars in a respective weight ratio of 2:1 to 1:40 to control the water activity of a composition comprising an edible oil containing one or more carboxylic acids containing at least 18 carbon atoms and at least 2 carbon-carbon double bonds, or an ester thereof.

To overcome the above described problems associated with the use of sugar alcohols in general, and mannitol in particular, to stabilise emulsified oil or fat in powdered form additional ingredients in the form of reducing carbohydrates, and essentially reducing sugars are used.

Thereto, the partial incompatibility of sugar alcohols within a matrix containing—apart from oil or fat and proteins—an additional amount of reducing carbohydrates had to be solved. The inventors have experienced that it is impossible to incorporate reducing sugars, such as glucose syrup solids, in the matrix material at levels, wherein the weight ratio sugar alcohol/reducing sugar exceeds 2. In particular, it was found that when the ratio sugar alcohol/reducing sugar exceeds 2, this does not render a free-flowing powder, but a highly plastic and viscous material, which was not suitable as a powdered food ingredient. The incompatibility is thought to be partially related to the chemical-physical characteristics of the formed amorphous matrix, consisting of polyols and carbohydrates, which is obtained after spray drying or freeze drying.

The present invention provides a composition containing an edible oil which has one or more of the following favourable properties: good stability to oxidation, better taste and/or odour (particularly after storage), increased ease of processing and better handling. The composition may also provide benefits in a food product to which it is added, including increased stability, better organoleptic properties (including taste and/or odour and/or texture), and no additional negative laxative side effects of any of the used active ingredients.

Particularly, it has now been found that sugar alcohols such as mannitol can be used in spray dried matrices comprising protein, oil, and reducing sugars, such as glucose syrup solids, without losing any of the stabilising effect of mannitol, when the ratio sugar alcohol(s) to reducing sugars is in the particular range mentioned. Preferably, this range lies between 1:1 and 1:10, and more preferably between 1:2 and 1:6. In addition, the powder of the present invention is relatively neutral in respect to smell and taste, and shows less oxidation defects directly after production. Even more beneficial is the fact that the present invention provides more resistance to oxidation than formerly described compositions, prepared using spray drying as the process of manufacture.

The compositions of the invention are preferably suitable for use in a food product. The compositions may be consumed themselves, but they are typically incorporated into a food product or a nutritional supplement before consumption.

The compositions are preferably in the form of a free-flowing powder. The term "free-flowing powder", as used herein, is well known to those skilled in the art and includes particulate materials that can be poured (e.g., from one vessel having an opening of from about 10 cm$^2$ to 50 cm$^2$ to another vessel of similar dimensions) without substantial clumping of the particles. In detail, the term "free-flowing" is used for a powdered material that is not sticky, and thus has no or hardly any tendency to agglomerate or to adhere to contact surfaces. The so-called angle of repose, $\theta_r$, is sometimes used as a measure for the flow properties of powders. The angle of repose is the angle that a cone of powder forms between a flat surface when it is poured onto that surface. Typically, for a free-flowing powder $\theta_r$ is low, e.g. smaller than 60° or smaller than 45°, such as 40° or less.

Such free-flowing powders are sometimes referred to as dry powders, although the word "dry" in this context does not necessarily imply the absence of water from the composition. Typically, the powder has a mean particle size of from about 10 μm to about 1000 μm, preferably from about 50 μm to about 800 μm, more preferably from about 200 μm to about 400 μm. Particle sizes can be determined using techniques known to the skilled man, e.g. by using the well-known Coulter Counter. For example, more than 95% by weight of the particles may have a size of less than 800 μm and/or more than 85% by weight of the particles may have a size of less than 500 μm and/or more than 90% by weight of the particles may have a size of greater than 20 μm and/or 65% by weight of the particles may have a size of greater than 200 μm. The powder form of the composition of the invention preferably has a bulk density of from 200 to 600 g/l, such as 300 to 500 g/l.

The compositions of the invention preferably comprise the edible oil in an amount of from about 40% to about 80% by weight, more preferably from about 45% to about 75% by weight, even more preferably from about 45% to about 60% by weight. This can correspond to an amount of the one or more carboxylic acids or esters thereof of from about 8% to about 80%, more preferably from about 12% to about 65%, even more preferably from 15% to 50% by weight of the composition; in preferred embodiments, the composition can comprise from about 15% to about 50% by weight (e.g., 20% to 40% by weight) of the one or more carboxylic acids or esters thereof. Unexpectedly, the compositions of the invention are found to be stable at these higher levels of oil.

The edible oil may comprise the one or more carboxylic acids or esters thereof either as the sole component or as one component of a mixture. The amount of the one or more carboxylic acids or esters thereof in the edible oil is at least 20% by weight of the edible oil, preferably at least 25% by weight, more preferably at least 28% by weight of the edible oil. Other components of the edible oil may include, for example, saturated carboxylic acids having from 12 to 30 carbon atoms, mono-unsaturated carboxylic acids having from 12 to 30 carbon atoms and mixtures thereof, typically as their esters, such as glyceride esters e.g., triglycerides.

The edible oil is preferably capable of providing health benefits.

The one or more carboxylic acids comprise at least 18 carbon atoms and at least 2 carbon-carbon double bonds. Preferably, the one or more carboxylic acids comprise from 18 to 30 (for example, 18 to 24) carbon atoms and from 2 to 6 carbon-carbon double bonds. The one or more carboxylic acids may be single carboxylic acids or mixtures of two or more carboxylic acids. Each of the one or more carboxylic acids may be in the form of the free acid, an ester or mixtures of free acid and one or more esters. Typically, the one or more carboxylic acids will be in the form of a complex mixture as present in or derived from a natural source. Examples of carboxylic acids are docosahexaenoic acid (DHA), eicosapentaenoic acid (EPA), conjugated linoleic acid (CIA) (including the cis-9, trans-11 and trans-10, cis-12 isomers and mixtures thereof), stearidonic acid, linolenic acid, alpha-linolenic acid, gamma-linolenic acid, arachidonic acid and mixtures thereof. Preferably, the one or more carboxylic acids are selected from DHA, EPA and mixtures thereof. In a mixture of DHA and EPA, the components can be present at any ratio, but a weight ratio of DHA/EPA of 0.4 to 8.0 can be preferred for certain applications.

The one or more carboxylic acids may be in the form of free acids (including salts thereof, such as sodium salts), or in the form of esters. Suitable esters include esters of the carboxylic acids with aliphatic alcohols containing from one to six carbon atoms, such as ethyl esters. Other suitable esters include esters with alcohols and polyols that are acceptable in food products. Examples of other esters are mono-, di-, and tri-glycerides and mixtures thereof. Triglyceride esters are particularly preferred, typically as the major component (i.e., greater than 50% by weight) together with mono- and/or di-glycerides, for example up to 35% by weight diglycerides and up to 5% by weight monoglycerides.

The term edible oil covers oils that are non-toxic and can be consumed as part of a normal diet. The edible oil is typically a liquid at 25° C. and atmospheric pressure and is preferably liquid within the temperature range of 0° C. to 25° C. at atmospheric pressure. The oil is generally hydrophobic (for example it is substantially immiscible with water at a 1:1 weight ratio at 25° C.). The oil is preferably obtained or obtainable from a natural source, such as a vegetable oil, an animal oil (including fish oil) or animal fat, or a microbial oil, but may also be synthetic. The oil may be a mixture of oils from different sources or a mixture of a synthetic oil with one or more oils from natural sources.

It is particularly preferred that the edible oil is fish oil. The fish oil may be directly or indirectly obtainable from fish and may be, for example, a fish oil concentrate, a fractionated fish oil or a modified fish oil. Fish oils include oils from mackerel, trout, herring, tuna, salmon, cod, menhaden, bonito and sardines. Fish oil typically contains a mixture of omega-3 and omega-6 PUFA as their triglycerides, together with other components. In a particularly preferred embodiment, the oil is a fish oil concentrate comprising at least 30% by weight DHA and/or at least 20% by weight EPA.

Compositions of the invention comprise one or more sugar alcohols (ii) and one or more reducing sugars (iii). The weight ratio of edible oil (i) to the total weight of (ii) and (iii) is from 1:3 to 10:1, preferably from 1:5 to 5:1, more preferably from 1:2 to 3:1.

The one or more sugar alcohols may be single sugar alcohols or mixtures of two or more sugar alcohols. Sugar alcohols are polyols obtainable by reduction of saccharides, for example by hydrogenation. Preferred sugar alcohols are selected from mannitol, maltitol, sorbitol and mixtures thereof. Mannitol has been found to be particularly preferred for ease of processing and stability of the composition. The amount of the one or more sugar alcohols in the composition of the invention is preferably from about 1% to about 50% by weight, more preferably from about 2% to about 40% by weight, even more preferably from about 3% to about 30% by weight, such as from about 4% to about 20% by weight, for example about 5% to about 15% by weight.

The one or more reducing sugars may be single reducing sugars or mixtures of two or more reducing sugars. Reducing sugars include mono- and di-saccharides such as glucose, fructose and maltose. Additionally, reducing sugars encompass trisaccharides and higher saccharides. Oligosaccharides having up to 50 (mono) saccharide moieties, more preferably having up to 45 saccharide moieties, such as 10-45 saccharide moieties, may also suitably be used. In preferred embodiments, maltodextrines and glucose syrups are used, preferably those having 15-40 dextrose equivalents (DE). Preferably, the one or more reducing sugars are derived from glucose syrup and, accordingly, are a mixture of reducing sugars. Glucose syrup is a starch hydrolysate containing reducing sugars, dextrin and water and typically contains not less than 25% by weight of reducing sugars calculated as glucose. Very good results are obtained while using glucose syrup having a DE of 20-40. The amount of the one or more reducing sugars in the composition of the invention is preferably from about 1% to about 50% by weight, more preferably from about 2% to about 40% by weight, even more preferably from about 5% to about 35% by weight, such as from about 4% to about 30% by weight, for example about 5% to about 20% by weight.

Compositions of the invention are preferably substantially free of cyclodextrins (i.e., they contain less than 1% by weight, preferably less than 0.01% by weight) or completely free of cyclodextrins. The compositions preferably contain less than 10% by weight, more preferably less than 1% by weight, even more preferably less than 0.1% by weight, of maltodextrin or thin boiled starch, as defined in U.S. Pat. No. 6,638,557. This can reduce the overall complexity of the process and costs.

The composition of the invention is preferably dispersible in water having a temperature of about 15° C.

The weight ratio of one or more sugar alcohols (ii) to one or more reducing sugars (iii) is from about 2:1 to about 1:40, preferably from about 1:1 to about 1:20, more preferably from about 1:1 to about 1:10, even more preferably from about 1:2 to about 1:4.

The compositions of the invention optionally comprise, in addition to components (i), (ii) and (iii), one or more of an emulsifier, an antioxidant, a flavouring agent, a free flowing agent and a colouring agent, which types of additives are well-known additives for the person skilled in the field of preparing spray-dried food-products and/or storage stable unsaturated oil products. Emulsifiers include, for example, proteins, protein hydrolysate, as well as low molecular weight emulsifiers, such as polysorbate esters, monoglycerides, diglycerides, propylene glycol or glycerol esters of fatty acids, propylene monostearate, sorbitan monostearate, sorbitan trioleate and lecithin. Various sources of protein or protein hydrolysate may be employed; milk proteins such as whey protein and caseinate are preferred. Other suitable surface active ingredients include emulsifying, modified starches, such as Hi Cap®. Such modified starches can, e.g. be modified by reaction with n-octenylsuccinyl anhydride (NOSA). Antioxidants include ascorbic acid and its salts (e.g., sodium salt), tocopherol, carotenoids and extracts from natural products (such as Origanox from oregano). Free flowing agents, which are also termed anti-caking agents, include silica and tricalcium phosphate. Other optional components include metal chelating agents such as tetrasodium pyrophosphate, and buffering agents such as salts of citrate, ortho phosphate, diphosphate or polyphosphate.

Compositions of the invention have been found to have particularly good stability to oxidation, even in the absence of known antioxidants. Surprisingly, oxidation stability can be higher in compositions containing higher amounts of oil. The oil component of the composition preferably has a peroxide value of less than 10 meq/kg, preferably less than 9 meq/kg, more preferably less than 8 meq/kg, even more preferably less than 7 meq/kg, such as less than 6 or less than 5 meq/kg after storage in contact with air at 30° C. for 12 weeks up to 16 weeks.

The compositions of the invention can be produced by a method which comprises forming an aqueous mixture comprising edible oil, one or more sugar alcohols and glucose syrup and drying the composition. More particularly, the oil and all other ingredients for the powder are emulsified at a dry matter content of generally 50 to 70% (w/w), all other ingredients being dissolved or dispersed in water prior to addition of/in the oil. The best results are obtained when the emulsification is performed in such a way that an average oil droplet diameter is less than 1 micrometer (which droplet size can be determined using for instance a Malvern Mastersizer®). Typically, pre-emulsification is performed at a temperature of 45-65° C. by means of an Ultra Turrax® at 6000 to 10,000 rpm. Subsequently, a two stage high pressure homogeniser can be used (150-250 bar/30-5-bar). Drying is preferably carried out by spray drying. Conditions for spray drying are known to, or can be readily determined by, those skilled in the art. Spray drying is preferably carried out under conditions such that the resulting powder has a mean particle size of from 20 μm to 800 μm. Suitable results are obtained when the emulsion prepared is fed in a spray dryer by means of a high-pressure pump operating at a pressure of 50 to 200 bar. The spray dryer operates typically with an inlet temperature of 150-200° C., and an outlet temperature of 60-90° C. Preferably, the mixture comprises: (a) 25% to 90% by weight edible oil; (b) from 5% to 25% by weight of one or more sugar alcohols; (c) from 5% to 70% by weight glucose syrup; and (d) from 0 to 15% of optional components, the total amount of (a), (b), (c) and (d) being 100%. More preferably, the mixture comprises: (a) 25% to 70% by weight edible oil; (b) from 5% to 15% by weight of one or more sugar alcohols; (c) from 15% to 60% by weight glucose syrup; and (d) from 0 to 15% of optional components, the total amount of (a), (b), (c) and (d) being 100%. Even more preferably, the mixture comprises: (a) 40% to 60% by weight edible oil; (b) from 5% to 15% by weight of one or more sugar alcohols; (c) from 20% to 40% by weight glucose syrup; and (d) from 0 to 15% of optional components, the total amount of (a), (b), (c) and (d) being 100%.

The combination of glucose syrup and sugar alcohol has been found to be particularly effective for producing the composition.

The mixture may be prepared by combining the components (a) to (d), for example by mixing and optionally stirring to form an emulsion. The emulsion is then preferably spray dried to a water content of less than 5% by weight (preferably less than 4% by weight). The particulate material (i.e., powder) thus formed is then collected.

The composition is preferably packaged in the presence of an inert gas (e.g., nitrogen) and stored at a temperature below room temperature, for example from about 5° C. to about 10° C., prior to use.

The food products of the invention comprise from 0.01% to 20% by weight, preferably from 0.01% to 10% by weight, more preferably from 0.01% to 5% by weight, of a composition of the invention. The amount of the composition that is present in the food product will depend on the nature of the food product itself. For example, relatively high amounts of the composition may be tolerated in bakery products while smaller amounts are required in certain beverages. Suitable food products include, for example, bakery products (e.g., bread, biscuits or cookies, snack bars), oil-based products (e.g., spreads, salad dressings), dairy products (e.g., milk, reconstitutable milk products, yoghurt, ice cream), infant formulas (which are liquids or reconstituted powders fed to infants and young children) and non-dairy beverages (e.g., fruit juice). Food products of the invention typically comprise up to 99% by weight water and up to 50% by weight of oils or fats other than the edible oil derived from the composition of the invention.

The use of the combination of one or more sugar alcohols with one or more reducing sugars has been found to increase the stability of the edible oil, as determined by off taste and/or odour. Additionally or alternatively, the stability of the edible oil may be determined by peroxide value and/or anisidine value. The invention has surprisingly been found to be effective at relatively higher levels of oil.

The use of the combination of one or more sugar alcohols and one or more reducing sugars in the invention may also help control the water activity of a composition comprising the edible oil. For example, it can be important to control water activity when formulating a water-in-oil emulsion such as a spread (e.g., a margarine) in order to enhance the stability of the emulsion.

The following non-limiting examples illustrate the invention and do not limit its scope in any way. In the examples and throughout this specification, all percentages, parts and ratios are by weight unless indicated otherwise.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

EXAMPLES

Examples 1 to 4

The following formulations (Examples 1 to 4) were prepared (values in the table are parts by weight). Examples 1 and 2 are comparative examples. Examples 3 and 4 are examples of compositions of the invention.

|  | Example 1 | Example 2 | Example 3 | Example 4 |
| --- | --- | --- | --- | --- |
| Marinol D40* | 50 | 30 | 30 | 50 |
| Mannitol |  |  | 10 | 10 |
| Glucose syrup | 39 | 59 | 49 | 29 |
| Na caseinate | 10 | 10 | 10 | 10 |
| Na ascorbate | 1 | 1 | 1 | 1 |
| Antioxidant | 0.3 | 0.3 | 0.3 | 0.3 |

*Marinol D40 is a commercial fish oil concentrate containing about 40% DHA and 6% EPA, by weight based on total fatty acids.

Examples 1 to 4 were prepared by spray drying a mixture comprising the various components. More specifically, Examples 1 to 4 were prepared by emulsification of the oils together with all ingredients at a dry matter content of 60% w/w. Thereto, the ingredients other than oil were dissolved or dispersed prior to the addition of the oil. Pre-emulsification was performed at a temperature of 45° C. to 65° C. by means of an Ultra Turrax at 6000 to 10 000 rpm. Subsequently, a two stage high pressure homogeniser was used with 200 bar for the first stage and 50 bar for the second stage of homogenisation. The emulsions thus obtained were then fed in to a spray dryer by means of a high-pressure pump operating at a pressure of 150 bar. The spray dryer was operated at an inlet temperature of 180° C. and an outlet temperature of 75° C. The obtained powders were analysed for moisture content: values ranging from 1.4% to 2.4% were found. The powders of Example 3 and 4 were free-flowing.

The compositions of Examples 1 to 4 were stored under air at 30° C. for up to 21 weeks. The stability of the compositions before, during and after storage was assessed. The degree of oxidation of the compositions was determined by measuring anisidine and peroxide values; methods for determination can be carried out according to ISO 3960 (May 1998) and ISO 6885 (May 1998). Sensory evaluation was also carried out by a team of panellists by tasting the powder when reconstituted in milk. In the sensory tests, a lower number indicates less smell and taste and therefore a better product.

| Anisidine values | | | | |
| --- | --- | --- | --- | --- |
| Storage powder: 30° C., under air | | | | |
| Weeks | Example 1 | Example 2 | Example 3 | Example 4 |
| 0 | 18.4 | 13.1 | 14.9 | 13.5 |
| 8 | 18.7 | 14.7 | 11.3 | 13.3 |
| 12 | 40.3 | 22.7 | 16.1 | 13.5 |
| 16 | 47.7 | 30.4 | 16.6 | 14.1 |

| Peroxide values (meq/kg) | | | | |
| --- | --- | --- | --- | --- |
| Storage powder: 30° C., under air | | | | |
| Weeks | Example 1 | Example 2 | Example 3 | Example 4 |
| 0 | 2.3 | 2 | 1.9 | 2.3 |
| 8 | 5.4 | 5.8 | 4.5 | 5.3 |
| 12 | 43 | 13.5 | 7.6 | 4 |
| 16 | 55 | 14.4 | 2.1 | 1.5 |

| Sensory evaluation I | | | | |
| --- | --- | --- | --- | --- |
| Storage powder: 30° C., under air Evaluation: taste of powder in milk | | | | |
| Weeks | Example 1 | Example 2 | Example 3 | Example 4 |
| 3 | 3 | 2.25 | 2 | 2 |
| 4 | 3.5 | 2.25 | 1.75 | 2.25 |
| 6 | 5 | 3.25 | 2.25 | 2.75 |
| 8 | 5 | 3.75 | 2.5 | 2.5 |
| 10 | 5 | 4 | 2.75 | 2.5 |
| 12 | 5 | 4 | 2.5 | 2.5 |
| 14 | 5 | 4.25 | 3 | 2 |
| 16 | 5 | 4.75 | 3 | 2.25 |
| 21 | 5 | 5 | 3.5 | 2 |

Sensory evaluations were repeated after storage at 30° C. under air and were based on the smell of the powder itself. The results were as follows:

| Sensory evaluation II | | | | |
| --- | --- | --- | --- | --- |
| Storage powder: 30° C., under air Evaluation: smell of powder as such | | | | |
| Weeks | Example 1 | Example 2 | Example 3 | Example 4 |
| 3 | 2 | 2 | 2 | 1.75 |
| 6 | 2 | 1.75 | 1.75 | 1.75 |
| 8 | 2.25 | 2.5 | 2 | 1.75 |
| 10 | 2.25 | 2 | 2 | 2 |
| 12 | 3 | 2 | 1.75 | 1.75 |
| 14 | 3.75 | 2.75 | 1.75 | 1.5 |

In sensory evaluations I and II, compositions were scored from 1 (neutral: best) to 5 (off-flavour: worst).

The results show that the compositions according to the invention containing mannitol and glucose syrup showed superior performance compared to corresponding compositions using glucose syrup alone. The composition of the invention containing a higher amount of oil (Example 4) surprisingly performed better than the composition containing a lower amount of oil (Example 3).

Examples 5 and 6

Examples 1 to 4 were repeated using 50% by weight of Marinol C38, a fish oil containing about 40% by weight of DHA and EPA in roughly equal amounts by weight. Example 5 is an example of a composition of the invention. Example 6 is a comparative example. The formulations were as follows (in the table, values are parts by weight):

|  | Example 5 | Example 6 |
| --- | --- | --- |
| Marinol C38* | 50 | 50 |
| Mannitol | 15 |  |
| Glucose syrup | 24 | 39 |
| Na caseinate | 10 | 10 |
| Na ascorbate | 1 | 1 |
| Antioxidant | 0.3 | 0.3 |

*Marinol C38 is a commercial fish oil containing about 40% by weight EPA and DHA based on total amount of fatty acids The powder of example 5 was free-flowing.

Determination of anisidine values, peroxide values and sensory properties was carried out after storage and the results were as follows.

Anisidine values

Storage powder: 5 and 30° C., under air

| | 5° C. | | 30° C. | |
|---|---|---|---|---|
| weeks | Example 5 | Example 6 | Example 5 | Example 6 |
| 14 | 9 | 10.9 | 11.5 | 31.4 |

Peroxide values (meq/kg)

Storage powder: 5 and 30° C., under air

| | 5° C. | | 30° C. | |
|---|---|---|---|---|
| Weeks | Example 5 | Example 6 | Example 5 | Example 6 |
| 14 | 1.6 | 2.9 | 3.8 | 44.6 |

Sensory evaluation I

Storage powder: 30° C., under air
Evaluation: taste of powder in milk

| Weeks | Example 5 | Example 6 |
|---|---|---|
| 3 | 2 | 2 |
| 5 | 2 | 2 |
| 7 | 2 | 2 |
| 9 | 2 | 2.5 |
| 11 | 2.5 | 3 |
| 14 | 2.5 | 5 |

The results show that the composition of Example 5 containing mannitol and glucose syrup exhibited improved oxidation stability and taste compared to Example 6 which is a corresponding composition containing glucose syrup alone.

Examples 7-13

Examples 1 to 4 were repeated using the compositions given in the following table. It is noted that none of these examples 7-13 contain sodium ascorbate as an additional antioxidant.

| | Ex. 7 | Ex. 8 | Ex. 9 | Ex. 10 | Ex. 11 | Ex. 12 | Ex. 13 |
|---|---|---|---|---|---|---|---|
| Glucose syrup | 55.5 | 45.5 | 27 | — | 8 | 31.5 | 27 |
| Sodium caseinate | 10 | 10 | 10 | 10 | 6 | 10 | 10 |
| dipotassium phosphate | 1.5 | 1.5 | 1.5 | 1.5 | 15 | 1.5 | 1.5 |
| Mannitol | 10 | 10 | 10 | 37 | 3.0 | 5.5 | — |
| Sorbitol | — | — | — | — | — | — | 10 |
| Marinol D-40 | 20 | 30 | 50 | 50 | — | 50 | 50 |
| Clarinol G-80† | — | — | — | — | 80 | — | — |
| Moisture | 3 | 3 | 1.5 | 1.5 | 1.5 | 1.5 | 1.5 |

†Clarinol G-80 is a commercial conjugated linoleic acid

The compositions of examples 7-13 were stored at 30° C. under air for up to 8 weeks; in addition the compositions were stored at 40° C. in the absence of oxygen. The stability of the compositions before storage and after 4, 6 and 8 weeks storage was assessed. The degree of oxidation of the compositions was determined by measuring peroxide values and anisidine values, and a sensory evaluation was carried out by a team of panellists by tasting the powder when reconstituted in milk. Further details on the determinations are given in examples 1-4. The results follow from the following tables. Example 10 is a comparative example; it does not contain glucose syrup.

Peroxide in time 30° C. under air

| Example | | 0 weeks | 4 weeks | 6 weeks |
|---|---|---|---|---|
| 7 | 20% Marinol + 10% Mannitol | 2.4 | 7.0 | 10.4 |
| 8 | 30% Marinol + 10% Mannitol | 2.1 | 8.5 | 14.9 |
| 9 | 50% Marinol + 10% Mannitol | 2.5 | 22.6 | 39.9 |
| 10 | 50% Marinol + 37% Mannitol | 5.1 | 60.8 | 110.5 |
| 11 | 80% Clarinol + 3% Mannitol | 0.6 | 1.1 | 1.4 |
| 12 | 50% Marinol + 5.5% Mannitol | 0.9 | 27.9 | 60.0 |
| 13 | 50% Marinol + 10% Sorbitol | 1.0 | 23.5 | 55.6 |

Sensory in time, 30° C. under air

| Example | | 0 weeks | 4 weeks | 6 weeks | 8 weeks |
|---|---|---|---|---|---|
| 7 | 20% Marinol + 10% Mannitol | 2 | 3.25 | 3.0 | 4.5 |
| 8 | 30% Marinol + 10% Mannitol | 2 | 2.5 | 2.25 | 4.5 |
| 9 | 50% Marinol + 10% Mannitol | 2 | 3.0 | 3.0 | 5.0 |
| 10 | 50% Marinol + 37% Mannitol | 2 | 4.5 | 4.5 | 5.0 |
| 11 | 80% Clarinol + 3% Mannitol | nm* | nm | nm | nm |
| 12 | 50% Marinol + 5.5% Mannitol | 2 | 3.0 | 3.75 | 5.0 |
| 13 | 50% Marinol + 10% Sorbitol | 2 | 2.5 | 4.0 | 5.0 |

*nm: not measured

Anisidine Value in time, 30° C. under air

| Example | | 0 weeks | 6 weeks |
|---|---|---|---|
| 7 | 20% Marinol + 10% Mannitol | 50.8 | 53.3 |
| 8 | 30% Marinol + 10% Mannitol | 31.5 | 30.9 |
| 9 | 50% Marinol + 10% Mannitol | 20.0 | 30.4 |
| 10 | 50% Marinol + 37% Mannitol | 11.9 | 73.5 |
| 11 | 80% Clarinol + 3% Mannitol | 10.6 | 11.3 |
| 12 | 50% Marinol + 5.5% Mannitol | 14.7 | 30.0 |
| 13 | 50% Marinol + 10% Sorbitol | 15.6 | 29.7 |

Peroxide in time, 40° C., no oxygen

| Example | | 0 weeks | 8 weeks |
|---|---|---|---|
| 7 | 20% Marinol + 10% Mannitol | 2.4 | 2.2 |
| 8 | 30% Marinol + 10% Mannitol | 2.1 | 1.3 |
| 9 | 50% Marinol + 10% Mannitol | 2.5 | 5.6 |
| 10 | 50% Marinol + 37% Mannitol | 5.1 | 60.0 |
| 11 | 80% Clarinol + 3% Mannitol | 0.6 | 0.4 |
| 12 | 50% Marinol + 5.5% Mannitol | 0.9 | 1.0 |
| 13 | 50% Marinol + 10% Sorbitol | 1.0 | 0.8 |

Anisidine Value in time, 40° C., no oxygen

| Example | | 0 weeks | 8 weeks |
|---|---|---|---|
| 7 | 20% Marinol + 10% Mannitol | 50.8 | 43.2 |
| 8 | 30% Marinol + 10% Mannitol | 31.5 | 32.5 |
| 9 | 50% Marinol + 10% Mannitol | 20.0 | 15.1 |
| 10 | 50% Marinol + 37% Mannitol | 11.9 | 91.9 |
| 11 | 80% Clarinol + 3% Mannitol | 10.6 | 7.2 |
| 12 | 50% Marinol + 5.5% Mannitol | 14.7 | 11.1 |
| 13 | 50% Marinol + 10% Sorbitol | 15.6 | 10.5 |

The effect of using a combination of glucose solids and mannitol (examples 7-9 and 12) is better than the effect of mannitol alone (example 10). Further, if fish oil is replaced by conjugated linoleic acid, the improved stability is also achieved. In addition, the improved stability is obtained when mannitol is replaced by sorbitol.

Example 14

The composition is incorporated into an infant formula at a level of 0.2-2.0% by weight of the total composition by mixing the composition of Example 4 with the other ingredients of a standard infant formula.

Example 15

The following is an example of a spread according to the invention. The spread can be prepared according to the procedure described in Example 14 of WO 97/18320.

| Fat Phase: | |
|---|---|
| Fat Blend* | 40% |
| Hymono 7804 (emulsifier) | 0.3% |
| Colour (2% β-carotene) | 0.02% |
| Total | 40.32% |

*87:13 by weight sunflower oil and hardstock containing 3% by weight of the composition of Example 4

Aqueous Phase (to pH 5.1):

| Water | 56.46% |
|---|---|
| Skimmed Milk Powder | 1.5% |
| Gelatin (270 bloom) | 1.5% |
| Potassium Sorbate | 0.15% |
| Citric Acid Powder | 0.07% |
| Total | 59.68% |

Example 16

The composition of Example 5-6 was incorporated into milk at a level of 0.36% by weight of the milk. This was done by mixing the composition with milk (containing 1.7% fat). The mixture was preheated to about 60° C., homogenized in 2 steps (150/50 bar) and sterilized at 144° C. for 5 sec. The milk was cooled down to 4° C. and packed in sterile polypropylene beakers.

The milk was stored at 25° C. and the stability was assessed. A sensory evaluation was carried out by a team of panellists. The results were as follows.

Sensory evaluation

Storage milk: 35 days, 25° C.
Evaluation: smell and taste of milk

| Days | Example 5 in milk | Example 6 in milk |
|---|---|---|
| 0 | 0 | 0 |
| 1 | 0 | 0 |
| 7 | 0 | 1 |
| 35 | 0 | 1 |

In the sensory evaluation the compositions were scored 0 (acceptable) or 1 (unacceptable). The results show that in a milk application the composition according to the invention containing mannitol and glucose syrup showed superior performance compared to the corresponding composition using glucose syrup alone Example 17

The following example has been carried out to illustrate the preparation of lipid coated encapsulates containing the powder as described in Example 4. The functionality afforded by the lipid coating has been evaluated in various tests. Skilled practitioners also recognize that flow agents and surface active ingredients can be admixed with or incorporated in the resulting coated particles of the invention to facilitate handling or to adjust to a given desired functionality.

The lipid coating was provided to the surface of the powder described in Example 4 with a fluidised bed coater. The fluidised bed coater was operated as described in "Microencapsulation of Food Ingredients", Chapter 5: "Single Core Encapsulation", pp 83-101, Leatherhead Publishing, 1st Edition, Editor P. Vilstrup.

The lipid coating applied was typically a fully hydrogenated vegetable oil such as hydrogenated soybean oil optionally in combination with the anti-oxidant Tert Butyl Hydroquinone (TBHQ). The concentration of TBHQ is typically 100-200 ppm in such a lipid coating.

| Composition of Lipid Coated Encapsulate | Wt. % |
| --- | --- |
| Powder, Example 4 | 90 |
| Lipid Coating | 10 |
| TBHQ | q.s. |

The functionality of the resulting lipid coated powder particles versus Example 4 was evaluated by smell of the encapsulate, free flowability, and solubility. Results are described in the table below.

| Encapsulate | Smell | Free flowability | Solubility (5 gram/100 mL water; 15° C.) |
| --- | --- | --- | --- |
| Example 4 | Almost neutral | Moderate/Dusty | 100% |
| Example 17 | Neutral | Good | 5-15% |

The powder described in example 4 and this same powder but coated (Example 17) was evaluated in a shelf life test. Sensory evaluation was performed in milk, as described in examples 1-4. Results are shown in FIG. 1.

In sensory evaluations, compositions were scored from 1 (best: neutral) to 5 (worst: off-flavour).

The powder of Example 17 showed a more bland sensory profile during this shelf life test under air at 30° C. in closed containers than the powder of Example 4.

From the results shown above it is clear that specific benefits can be obtained with such a lipid coated encapsulate versus a non-coated variant.

The invention claimed is:

1. A composition comprising:
    (i) from 20% to 50% by weight of an edible oil;
    (ii) at least 10% by weight of a sugar alcohol selected from the group consisting of mannitol, sorbitol, and a combination thereof;
    (iii) glucose syrup; and
    (iv) at least one antioxidant other than the sugar alcohol;
    wherein the oil comprises at least 20% by weight of one or more carboxylic acids containing at least 18 carbon atoms and at least 2 carbon-carbon double bonds, or an ester thereof, and the weight ratio of (ii) to (iii) is 1:2 to 1:6, wherein the composition is spray-dried.

2. The composition according to claim 1 which is in the form of a free-flowing powder.

3. The composition according to claim 2, wherein the powder has a mean particle size of from 200 μm to 800 μm.

4. The composition according to claim 1, wherein the weight ratio of (i) to the total weight of (ii) and (iii) is from 1:3 to 10:1.

5. The composition according to claim 1, wherein the one or more carboxylic acids are selected from DHA, EPA, and mixtures thereof.

6. The composition according to claim 1, wherein the one or more carboxylic acids are in the form of glyceride esters.

7. The composition according to claim 1, wherein the oil is fish oil or a conjugated linoleic acid.

8. The composition according to claim 1, wherein the oil is a fish oil concentrate comprising at least 30% by weight DHA, or esters thereof.

9. The composition according to claim 1, wherein the oil is a fish oil concentrate comprising at least 20% by weight EPA or esters thereof.

10. The composition according to claim 1, wherein the oil is present in an amount from 30% to 50% by weight.

11. The composition according to claim 1, wherein the sugar alcohol is mannitol.

12. The composition according to claim 1, further comprising one or more of an emulsifier, a flavoring agent, a free flowing agent, or a coloring agent.

13. A process of producing a composition comprising from 20% to 50% by weight of an edible oil, a sugar alcohol, glucose syrup, and at least one antioxidant other than the sugar alcohol, the process comprising:
    providing an aqueous solution or dispersion of the edible oil, the sugar alcohol, the glucose syrup, and the at least one antioxidant, wherein the sugar alcohol is present in an amount of at least 10% by weight and is selected from the group consisting of mannitol, sorbitol, and a combination thereof; and
    spray-drying the aqueous solution or dispersion;
    wherein the edible oil comprises at least 20% by weight of one or more carboxylic acids containing at least 18 carbon atoms and at least 2 carbon-carbon double bonds, or an ester thereof, and the weight ratio of the sugar alcohol to the glucose syrup is 1:2 to 1:6.

14. A food product comprising 0.01% to 20% by weight of a composition according to claim 1.

15. The food product according to claim 14 which is selected from bakery products, oil-based products, dairy products, infant formulas, and non-dairy beverages.

16. The food product according to claim 15 which is selected from bread, biscuits or cookies, snack bars, milk, reconstitutable milk products, spreads, salad dressings, ice cream, and fruit juice.

17. The composition according to claim 1, wherein the weight ratio of (ii) to (iii) is from 1:2 to 1:4.

18. The process according to claim 13, wherein the weight ratio of the sugar alcohol to the glucose syrup is from 1:2 to 1:4.

* * * * *